(12) United States Patent
Calderone

(10) Patent No.: US 6,359,939 B1
(45) Date of Patent: Mar. 19, 2002

(54) NOISE-ADAPTIVE PACKET ENVELOPE DETECTION

(75) Inventor: Theodore Calderone, San Carlos, CA (US)

(73) Assignee: Diva Systems Corporation, Redwood City, CA (US)

( * ) Notice: Subject to any disclaimer, the term of this patent is extended or adjusted under 35 U.S.C. 154(b) by 0 days.

(21) Appl. No.: 09/081,970

(22) Filed: May 20, 1998

(51) Int. Cl.[7] .............................................. H04L 27/06
(52) U.S. Cl. ...................... 375/316; 375/319; 375/342; 375/367; 381/94.1; 327/60
(58) Field of Search ................................. 375/316, 319, 375/227, 342, 367; 381/94.1; 327/60

(56) References Cited

U.S. PATENT DOCUMENTS

| | | | |
|---|---|---|---|
| 4,063,033 A | * 12/1977 | Harbert et al. | 381/94.1 |
| 5,052,027 A | 9/1991 | Poklemba et al. | 375/103 |
| 5,263,091 A | * 11/1993 | Waller, Jr. | 381/94.1 |
| 5,371,763 A | * 12/1994 | Ota et al. | 375/319 |
| 5,381,052 A | * 1/1995 | Kolte | 327/60 |

* cited by examiner

*Primary Examiner*—Stephen Chin
*Assistant Examiner*—Shuwang Liu
(74) *Attorney, Agent, or Firm*—Moser, Patterson & Sheridan, LLP

(57) ABSTRACT

A method and concomitant apparatus for adapting a logic threshold level in response to a background noise level in an information signal. Information signal excursions beyond the logic threshold are indicative of the presence of an information packet in the information signal. In this manner, a relatively low dynamic range information packet processor may reliably receive information packets.

17 Claims, 4 Drawing Sheets

NOISE-ADAPTIVE PACKET ENVELOPE DETECTION

The invention relates to digital communications systems generally and, more particularly, the invention relates to communications systems receiving packetized information streams.

BACKGROUND OF THE DISCLOSURE

Information distribution systems comprise one or more information servers that provide information to a plurality of subscribers via a distribution channel. For example, a cable television system includes head-end equipment to transmit audio-visual information to subscriber equipment via an analog or digital communications channel.

Subscriber equipment connected to an information distribution system typically injects some electromagnetic noise back into the distribution channel. For example, cable television subscriber equipment is susceptible to the electromagnetic noise generated by various electrical and mechanical devices used within a subscriber's household, such as air conditioning units, fans, appliances and the like. The subscriber equipment may operate to sum the generated electromagnetic noises and inject the summed noises back into the information distribution system. As new subscribers are added to the information distribution system, the total amount of injected noise increases proportionately, a phenomena known as "noise funneling." Thus, the amount of noise in the information distribution system is proportional to the number of subscribers and the amount of noise generated by the subscribers.

In the case of an interactive information distribution system, such as an interactive cable television system, the head-end may provide information to subscribers via a forward channel and receive information from subscribers via a back channel. In such an interactive system, the head-end equipment will also comprise a back channel modem receiver that is used to receive information (such as program requests) from subscriber equipment. It is known to implement a forward channel and a back channel on the same physical medium by using mutually exclusive spectral regions for each channel.

The modem receiver must be able to retrieve and process valid information from the back channel in a timely fashion. Moreover, the information received via the back channel is typically characterized as a burst mode data transmission. Thus, the modem receiver must be able to rapidly process the retrieved information to produce a desired result. Unfortunately, since the level of noise within the system is not constant, the signal threshold of the modem receiver must be adjusted to adapt to the noise level.

SUMMARY OF THE INVENTION

The invention is a method and apparatus for adapting a signal detection threshold level in response to a varying background noise level in an information signal. Signal excursions beyond the logic threshold are indicative of the presence of an information packet in the information signal.

Specifically, a digital data receiver according to the invention comprises a peak detector, coupled to receive a digital data input signal; for producing therefrom a bandwidth limited signal associated with a noise floor; an offset adjuster, coupled to the peak detector, for imparting an offset to the bandwidth limited signal associated with a noise floor to produce a threshold signal; and a comparator, coupled to receive the digital data input signal at a first input and the threshold signal at a second input, the comparator producing an output signal indicative of the digital data input signal having an amplitude level exceeding the threshold signal amplitude level, the signal excursion beyond the threshold level indicating a detection of an information packet.

In one embodiment of the invention, a digital data receiver includes an information packet processor having a relatively low dynamic range, e.g., a dynamic range tending to be insufficient for high reliability information packet detection and reception. In this embodiment, the digital data receiver includes an information packet detector having a relatively high dynamic range that is operatively coupled to the information packet processor such that the combined information packet detector and information packet processor provides substantially high reliability information packet detection and reception.

Specifically, a digital data receiver according to the invention comprises a packet detection circuit, coupled to receive a digital data input signal, for detecting the presence of an information packet in the digital data input signal and providing an output signal indicative of the presence; and a packet processing circuit exhibiting non-optimal packet detection capabilities, coupled to receive the digital data input signal and the packet detection circuit output signal; wherein the packet processing circuit, in response to the packet detection circuit output signal indicating that information packet is present in the digital data input signal, processing the digital data input signal to retrieve the indicated packet.

A method of detecting an information burst in a digital information signal according to the invention comprises the steps of: establishing a noise floor associated with a noise component of the digital information signal; modifying, in response to the noise floor, a logic threshold level associated with the information burst; evaluating, using the modified threshold level, the digital information signal; and providing indicia of digital information signal excursions beyond the threshold level.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
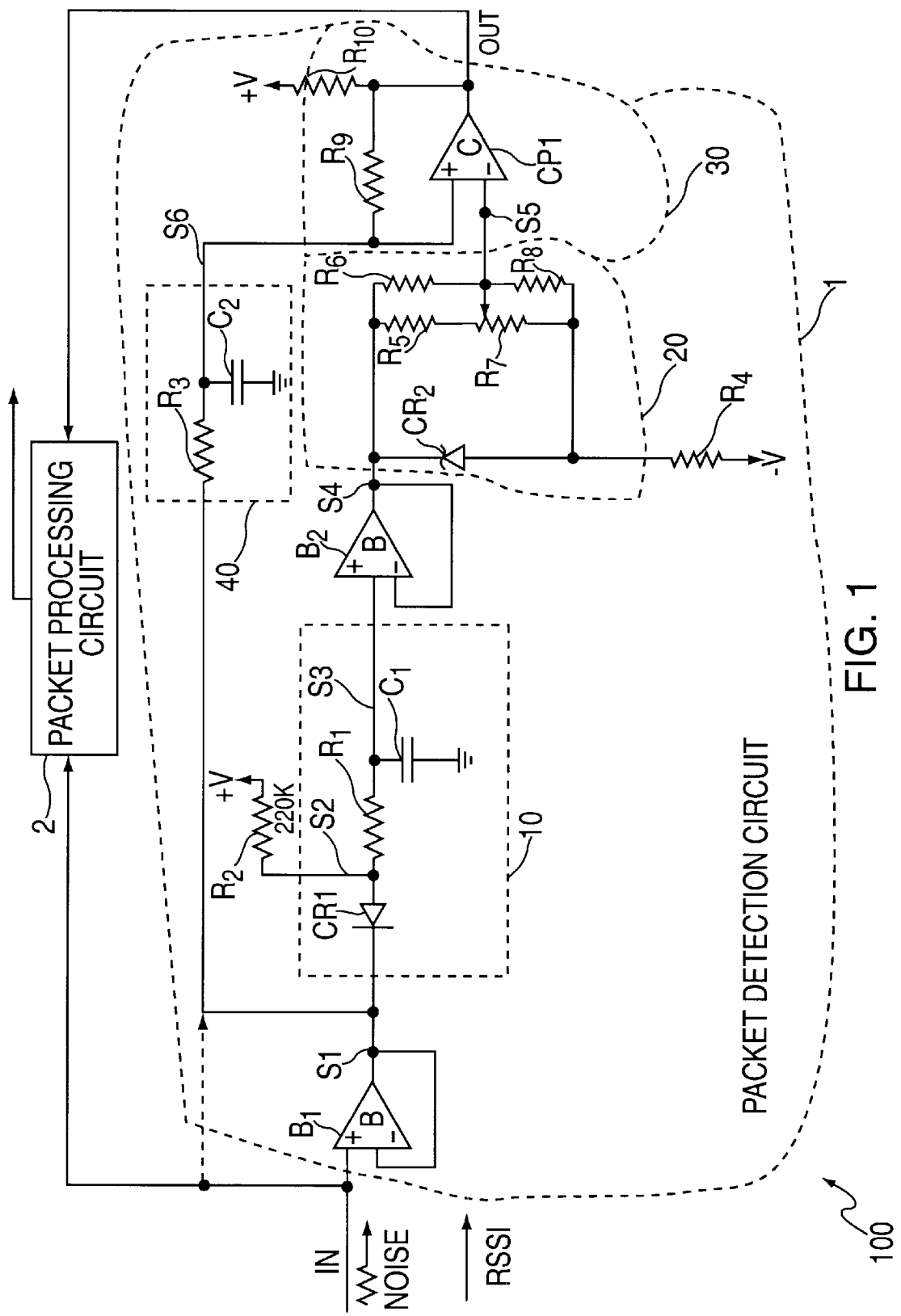
FIG. 1 depicts a schematic diagram of a noise adaptive packet envelope detection apparatus according to the invention.

FIG. 1 depicts a high level schematic diagram of a noise adaptive packet envelope detection apparatus according to the invention. Specifically, FIG. 1 depicts a packet envelope detection apparatus 1 operating in conjunction with a packet processing circuit 2 to, respectfully, detect and receive an information packet. The packet envelope detection apparatus 1 determines whether an information packet is present at an input terminal IN, and responsively produces an output signal OUT indicative of the presence of the information packet. Packet processing circuit 2 is also coupled to the input terminal IN and, in response to the output signal OUT indicating that an information packet is present, processes the information packet to extract the information therein. Advantageously, since the presence or absence of an information packet is known to the packet processing circuit 2, the actual circuitry necessary to implement such packet reception circuitry is greatly simplified. Moreover, since packet detection and packet reception functions are distributed between two functional elements or circuit blocks, each block or circuit may be optimized in a function-specific manner to provide a more robust system. Finally, since packet processing circuit 2 does not begin operation until an information packet is actually received, and unlike prior art information packet processing arrangements, the packet processing circuit 2 does not miss packets that are received while the packet processing circuit 2 is trying to process a prior, falsely indicated packet.

The input signal IN comprises, illustratively, a received signal strength indicator (RSSI) signal having a DC voltage that is proportional to the strength of the received signal. When there is no received signal (i.e., no information packet), the RSSI voltage is at a minimum voltage, responding only to accumulated noise within the system. This accumulated noise voltage, absent any measurable signal, establishes a "noise floor" for the system. Thus, the most negative excursion of the input signal IN voltage (i.e., the "negative peak") defines the noise floor for the system. By contrast, when the input signal IN includes a signal such as an information packet, the RSSI positive voltage increase due to that signal is proportional to the strength of the signal.

Referring now to the packet envelope detection apparatus 1 of FIG. 1, the input signal IN is coupled to a buffer B1 that produces, at an output, a buffered input signal S1. The buffered input signal S1 or, optionally, the input signal IN, is coupled to a negative peak detector 10 and a noise integrator 40.

The negative peak detector 10 detects the negative voltage excursions (i.e., "negative peaks") of the input signal IN or the buffered input signal S1 voltage to produce, at an output, a noise floor indicative signal S3. The noise floor indicative signal S3 is optionally coupled to a buffer B2 that produces, at an output, a buffered noise floor indicative signal S4. The noise floor indicative signal S3 or the buffered noise floor indicative signal S4 is coupled to an offset adjustment circuit 20.

The offset adjustment circuit 20 removes any offset errors imparted to the noise floor indicative signal S3 or the buffered noise floor indicative signal S4 by, e.g., the negative peak detector 10 and/or the buffers B1, B2. Additionally, the offset adjustment circuit 20 is used to establish a signal threshold level suitable for subsequent detection of signal pulses. The offset adjustment circuit produces, at an output, an adjusted noise floor indicative signal S5 that is coupled to a first input terminal of a comparator circuit 30.

The noise integrator 40 imparts a slight low pass filtering to the input signal IN or the buffered input signal S1 to produce, at an output, a noise integrated signal S6. The noise integrated signal S6 is coupled to a second input terminal of the comparator circuit 30.

The comparator circuit 30 compares the noise integrated signal S6 to the adjusted noise floor indicative signal S5 to produce, at an output, a pulse indicative (i.e., packet indicative) signal OUT. That is, if the comparison indicates that the noise integrated signal S6 is more positive than the adjusted noise floor indicative signal S5, then the pulse indicative signal OUT will indicate that an information packet is present. Similarly, if the comparison indicates that the noise integrated signal S6 is less positive than the adjusted noise floor indicative signal S5, then the pulse indicative signal OUT will indicate that an information packet is not present.

The exemplary negative peak detector 10 comprises a diode CR1, having a cathode coupled to receive the buffered input signal S1, and an anode coupled to a single pole low pass filter comprising a resistor R1 and a capacitor C1. Resistor R1 is coupled between the anode of diode CR1 and a non-inverting input of buffer B2. Capacitor C1 is coupled from ground to the junction formed by resistor R1 and the non-inverting input of buffer B2. In addition, a pull-up resistor R2 is coupled from the anode of diode CR1 to a positive voltage source, illustratively a positive 5 volt source.

In operation, pull-up resistor R2 and diode CR1 in combination with resistor R1 and capacitor C1 perform the negative peak detection function. Resistor R2 operates to forward bias diode CR1 and to form an RC network with capacitor C1. The timing constant of the RC network determines the rate at which the noise floor indicative signal S3 rises during a signal burst. The values of resistor R1 and capacitor C1 are selected such that when a signal burst does occur (i.e., an information packet is present), most of the "noise" voltage that was stored in capacitor C1 will be retained, thereby providing (via noise floor indicative signal S3) a suitable reference for the signal detection comparator CP1. In the exemplary embodiment, R1 is a 1.2k resistor, C1 is a 10 microFarad capacitor and R2 is a 220k resistor. The values of resistor R1 and capacitor C1 are also selected to provide a relatively rapid discharge rate, thereby rapidly re-establishing the noise floor after the termination of a received information packet. It must be noted that the noise floor indicative signal S3 will be offset by approximately 0.7 Volts due to the forward voltage drop of the diode CR1. This offset will be corrected by the offset adjustment circuit 20.

The exemplary buffers B1 and B2 are operational amplifiers. It will be known to those skilled in the art that voltage followers and other circuits may be employed to perform the same function. In the event that these buffers introduce an offset error to their respective input signals, the introduced error will be corrected by the offset adjustment circuit 20.

The exemplary offset adjustment circuit 20 comprises a Zener diode CR2 having a cathode coupled to receive the noise floor indicative signal S3 or the buffered noise floor indicative signal S4. The Zener diode CR2 has an anode coupled to a negative voltage source −V, illustratively a negative 5 volt source, via a resistor R4. A first series combination comprising a resistor R5 and a variable resistor R7 is coupled in parallel with the Zener diode CR2. Specifically, the resistor R5 is coupled to the cathode of Zener diode CR2, while the variable resistor R7 is coupled to the anode of Zener diode CR2. A second series combination comprising a resistor R6 and a resistor R8 is also coupled in parallel with the Zener diode CR2. Specifically, the resistor R6 is coupled to the cathode of Zener diode CR2, while the resistor R8 is coupled to the anode of Zener diode CR2. The junction of resistors R6 and R8 is coupled to a wiper of the variable resistor R7. The junction of resistors R6 and R8 also comprises the output of the offset adjustment circuit 20.

In operation, resistor R4 and Zener diode CR2 create, e.g., a 2.5 volt negative voltage source such that variable resistor R7 may be adjusted to remove any voltage offsets imparted to the noise floor indicative signal S3 or the buffered noise floor indicative signal S4. For example, the diode CR1 of the negative peak detector 10 causes an approximately 0.7 Volt offset. Moreover, the first and second buffers B1, B2 may cause additional offset errors.

The adjustment of variable resistor R7 also establishes the signal threshold of the pulse detection circuit. For example, the voltage on the center tap of variable resistor R7 is set so that adjusted noise-floor indicative signal S5 is nominally more positive (e.g., two hundred milliVolts) than the noise integrated signal S6.

The exemplary comparator circuit 30 comprises a comparator CP1 having an inverting input coupled to receive the adjusted noise-floor indicative signal S5, and a non-inverting input terminal coupled to receive the noise integrated signal S6. The comparator CP1 30 produces an output signal OUT having a "high" state if the magnitude of the signal at the non-inverting input exceeds the magnitude of the signal at the inverting input, and having a "low" state if the magnitude of the signal at the inverting input exceeds the magnitude of the signal at the non-inverting input. A positive feedback resistor R9 is coupled in a standard manner between the output and the inverting input of the comparator CP1. A pull-up resistor R10 is coupled from the output to a positive voltage source, illustratively a 5 volt source. The feedback resistor R9 is selected to establish an appropriate hysteresis level, while the pull-up resistor R10 establishes the "high" state level of the comparator CP1.

Figure 2A:
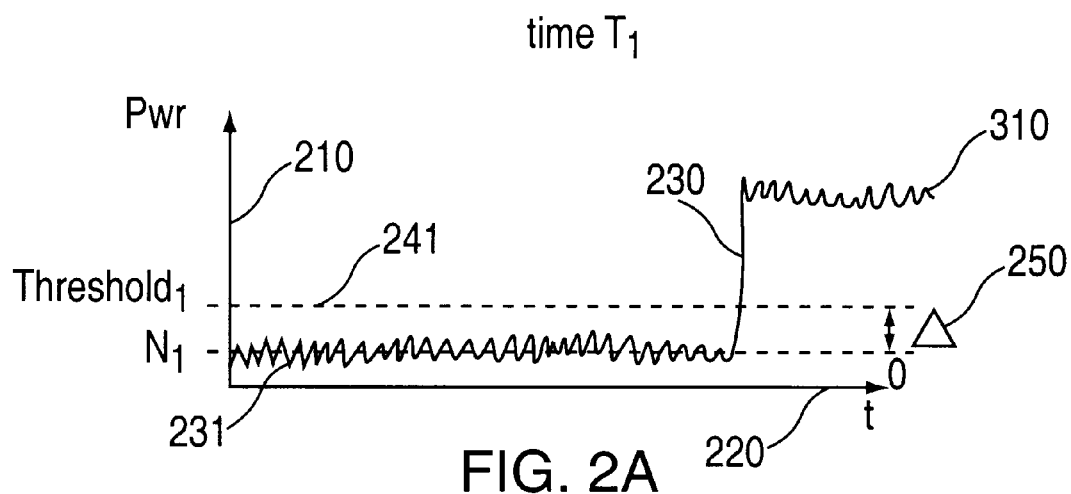
FIGS. 2A and 2B depict waveforms useful in understanding the invention.
Figure 2B:
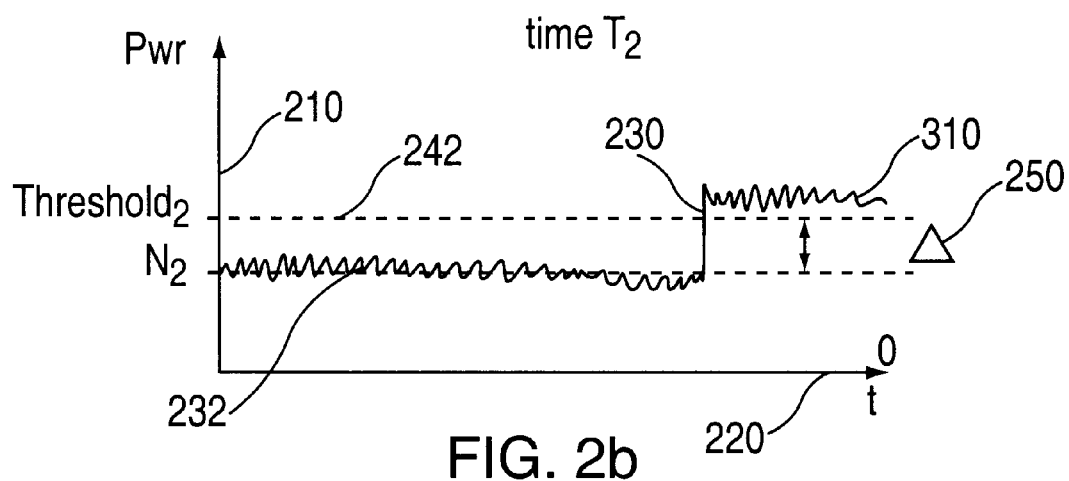

FIGS. 2A and 2B depict waveforms useful in understanding the invention. Specifically, FIGS. 2A and 2B each show a waveform 231 and 232 representing an input signal IN plotted in the time domain 220 as a function of power 210.

FIG. 2A shows an input signal IN having a background noise component N1. In operation, the invention measures the background noise component N1 and establishes a threshold level 241 that is offset from the background noise component N1 by an amount 250. Thus, in the waveform of FIG. 2A, an excursion 310 of the input signal IN beyond the threshold level 241 is detected by the comparator circuit 30, which responsively indicates that an information packet is present.

FIG. 2B shows an input signal IN having an background noise component N2. In operation, the invention measures the background noise component N2 and establishes a threshold level 242 that is offset from the background noise component by an amount 250. Thus, in the waveform of FIG. 2B, an excursion 310 of the input signal IN beyond the threshold level 242 is detected by the comparator circuit 30, which responsively indicates that an information packet is present.

It must be noted that the background noise component N1 is less than the background noise component N2. However, the offset 250 applied to the background noise components N1 and N2 to form respective threshold levels 241 and 242 is the same in each case (i.e., a fixed amount ). Ideally the fixed amount is selected to be as close to the noise floor as possible so that sufficient headroom for detecting the threshold transition 250 is retained. The fixed amount is also selected to be far enough above the noise floor 231, 232 such that nuisance threshold excursions caused by, e.g., transient noise sources, are kept to a minimum.

Figure 3:
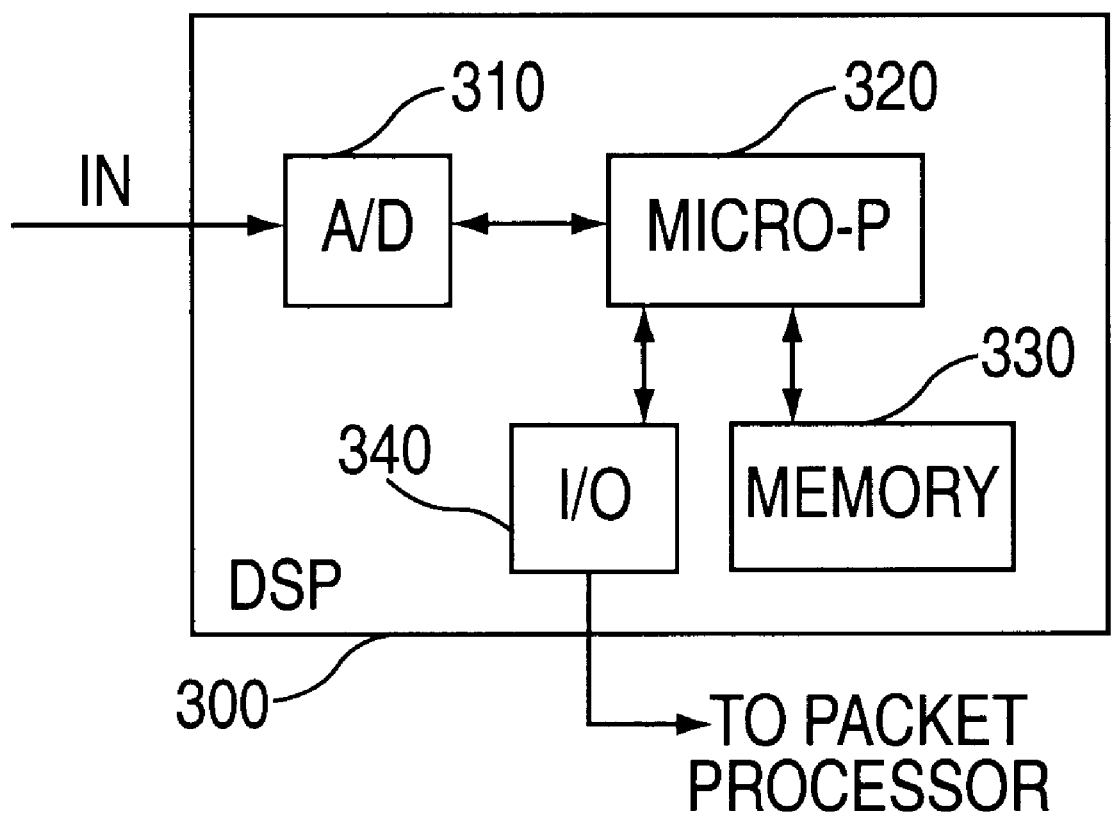
FIG. 3 depicts a digital signal processing (DSP) embodiment of the packet detection circuit of FIG. 1.

FIG. 3 depicts a digital signal processing (DSP) embodiment of the packet detection circuit of FIG. 1. Specifically, FIG. 3 depicts a digital signal processor 300 comprising a high speed analog to digital (A/D) converter 310, a microprocessor 320, a memory unit 330 and an input/output (I/O) unit 340. The A/D converter 310 receives and digitizes the input signal IN including the associated noise component. The digitized input signal is processed by the microprocessor 320, illustratively a high speed special purpose digital signal processing core, according to a method described below with respect to FIG. 4. The I/O unit 340 is responsive to the microprocessor 320 to produce an output signal indicative of the presence and/or absence of an information packet in the input signal IN.

Figure 4:
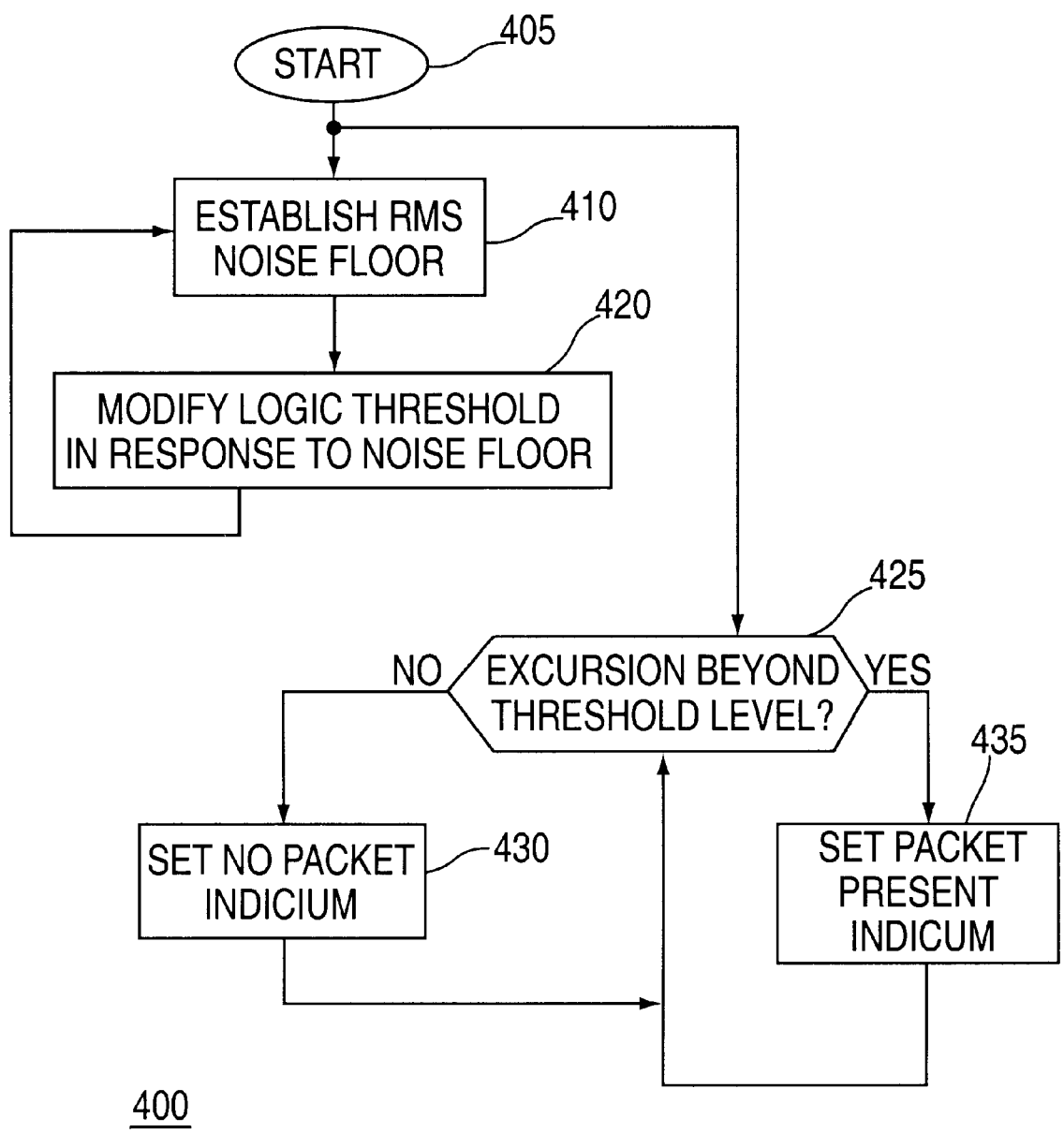
FIG. 4 depicts a flow diagram of a packet envelop detection routine according to the invention and suitable for use in the digital signal processing apparatus of FIG. 3.

FIG. 4 depicts a packet envelope detection method 400 suitable for use in the DSP processor 300 of FIG. 3. The method 400 of FIG. 4 is entered at step 405, where a standard initialization sequence of the DSP. 300 is performed. The method 400 comprises two parallel processing segments, a threshold adaptation segment (steps 410 through 420) and a threshold comparison segment (steps 425 through 435).

The threshold adaptation segment of the routine 400 is entered at step 410, where the background noise floor is established using standard DSP techniques. The routine 400 then proceeds to step 420, where the existing logic threshold is modified in response to the background noise floor established at step 410. The routine 400 then proceeds to step 410 where the threshold adaptation segment is repeated.

The threshold comparison segment of the routine 400 is entered at step 425, where a query is made as to whether an excursion of the input signal IN beyond the adapted threshold level has occurred. If the query at step 425 is answered affirmatively, then the routine 400 proceeds to step 435, where a packet present indicia is set, illustratively an output of a one or "high" logic state from I/O unit 340. The routine 400 then proceeds to step 425, where the threshold comparison segment is repeated. If the query at step 425 is answered negatively, then the routine 400 proceeds to step 430, where a packet not present indicia is set, illustratively, a zero or "low" output signal from I/O unit 340. The routine 400 then proceeds to step 425 where the threshold comparison segment is repeated.

The above-described invention has particular applicability in information distribution systems, such as cable television systems, in which varying levels of noise are injected into an upstream communications channel. It is important to note that circuitry utilized for the reception and processing of, e.g., upstream information packets, must perform a number of functions (each of which takes some amount of time) prior to successfully receiving a packet. Thus, if the receiver circuitry is trying to process false information while the correct information is being transmitted, then the correct information will likely be lost. The invention provides apparatus and methods that advantageously detect the presence of a packet, thereby assuring the receiver circuit that the time spent processing the packet will not be wasted, and that a packet will not be missed.

The dynamic range of the circuitry used to detect a packet must be high enough detect the first bit of an information packet. However, the dynamic range of the circuitry used to actually receive and process the packet may be lower. Thus, the invention provides system designers with the flexibility to use lower dynamic range (i.e., lower cost) information packet reception and processing circuitry.

In one embodiment of the invention, a digital data receiver includes an information packet processor having a relatively low dynamic range, e.g., a dynamic range tending to be insufficient for high reliability information packet detection and reception. In this embodiment, the digital data receiver includes an information packet detector having a relatively high dynamic range that is operatively coupled to the information packet processor such that the combined information packet detector and information packet processor provides substantially high reliability information packet detection and reception.

Although various embodiments which incorporate the teachings of the present invention have been shown and described in detail herein, those skilled in the art can readily devise many other varied embodiments that still incorporate these teachings.

What is claimed is:

1. A digital data receiver comprising:
   a peak detector, coupled to receive a digital data input signal, for producing therefrom a bandwidth limited signal associated with a noise floor;
   an offset adjuster, coupled to said peak detector, for imparting a predetermined offset to said bandwidth limited signal associated with the noise floor to produce a threshold signal, said offset adjuster adapting said predetermined offset in response to changes in said bandwidth limited signal; and
   a comparator, coupled to receive said digital data input signal at a first input and said threshold signal at a second input, said comparator producing an output signal indicative of said digital data input signal having an amplitude level exceeding said threshold signal amplitude level, wherein said amplitude level exceeding said threshold level indicates a detection of an information packet.

2. The digital data receiver of claim 1, wherein said peak detector comprises the series combination of a back-biased diode and a low pass filter.

3. The digital data receiver of claim 1, wherein said offset adjuster comprises a parallel combination of a constant voltage source and a resistive divider.

4. The digital data receiver of claim 1, further comprising:
   an information packet having low dynamic range packet detection capabilities, coupled to receive said output signal from said comparator and said digital data input signal, for receiving and processing an information packet from said digital data input signal when said comparator output indicates that an information packet is present in said digital data input signal.

5. The digital data receiver of claim 4, wherein said low dynamic range packet detection capabilities comprise a dynamic range tending to be insufficient for high reliability information packet detection.

6. The digital data receiver of claim 5, wherein said low dynamic range packet detection capabilities of said information packet processor are substantially compensated by said information packet processor utilizing said comparator output signal to indicate that an information packet is present.

7. The digital data receiver of claim 1, wherein said peak detector has a timing constant selected to maintain the noise floor in response to a packet indicative signal burst of said digital data input signal.

8. A digital receiver comprising:
   a packet detection circuit, coupled to receive a digital data input signal, for detecting the presence of an information packet in said digital data input signal and providing an output signal indicative of said presence; and
   a packet processing circuit having low dynamic range packet detection capabilities, coupled to receive said digital data input signal and said packet detection circuit output signal;
   said packet processing circuit, in response to said packet detection circuit output signal indicating that said information packet is present in said digital data input signal, processing said digital data input signal to retrieve said indicated packet, wherein said packet detection circuit comprises:
   a peak detector, coupled to receive the digital data input signal, for producing therefrom a bandwidth limited signal associated with a noise floor,
   an offset adjuster, coupled to said peak detector, for imparting an offset to said bandwidth limited signal associated with the noise floor to produce a threshold signal, and
   a comparator, coupled to receive said digital data input signal at a first input and said threshold signal at a second input, said comparator producing an output signal indicative of said digital data input signal having an amplitude level exceeding said threshold signal amplitude level, wherein said amplitude level exceeding said threshold level indicates a detection of an information packet.

9. The digital data receiver of claim 8, wherein said peak detector comprises the series combination of a back-biased diode and a low pass filter.

10. The digital data receiver of claim 8, wherein said offset adjuster comprises the parallel combination of a constant voltage source and a resistive divider.

11. The digital data receiver of claim 8, wherein said peak detector has a timing constant selected to maintain the noise floor in response to a packet indicative signal burst of said digital data input signal.

12. A method of detecting an information burst in a digital information signal, comprising the steps of:
   establishing a noise floor associated with a noise component of said digital information signal, wherein said step of establishing further comprises rectifying said digital information signal to produce a rectified signal, and low pass filtering said rectified signal to produce a low pass filtered signal, said low pass filtered signal establishing said noise floor;
   modifying, in response to said noise floor, a logic threshold level associated with said information burst, wherein said step of modifying further comprises selectively offsetting, by a predetermined amount, said low pass filtered signal to produce an offset noise floor signal defining said logic threshold level;
   evaluating, using said modified threshold level, said digital information signal; and
   providing indicia of digital information signal excursions beyond said threshold level.

13. The digital data receiver of claim 8, wherein said peak detector comprises the series combination of a back-biased diode and a low pass filter.

14. The digital data receiver of claim 8, wherein said offset adjuster comprises a parallel combination of a constant voltage source and a resistive divider.

15. The digital data receiver of claim 8, wherein said low dynamic range packet detection capabilities comprise a dynamic range tending to be insufficient for high reliability information packet detection.

16. The digital data receiver of claim 15, wherein said low dynamic range packet detection capabilities of said information packet processor are substantially compensated by said information packet processor utilizing said comparator output signal to indicate that an information packet is present.

17. The digital data receiver of claim 8, wherein said peak detector has a timing constant selected to maintain the noise floor in response to a packet indicative signal burst of said digital data input signal.

* * * * *

UNITED STATES PATENT AND TRADEMARK OFFICE
CERTIFICATE OF CORRECTION

PATENT NO.    : 6,359,939 B1
DATED         : March 19, 2002
INVENTOR(S)   : Theodore Calderone It is certified that error appears in the above-identified patent and that said Letters Patent is hereby corrected as shown below:

Column 1,
Line 62, the ";" should be a -- , --.

Column 5,
Lines 58, 59 and 61, after "amount" insert -- Δ --.

Column 7,
Line 37, after "packet" (first occurrence), insert -- processor --.

Signed and Sealed this

Eighteenth Day of June, 2002

*Attest:*

*Attesting Officer*

JAMES E. ROGAN
*Director of the United States Patent and Trademark Office*